Jan. 27, 1931.   J. A. ALGER   1,790,297
CHAIN AND SPROCKET CONSTRUCTION
Filed March 25, 1929   3 Sheets-Sheet 2
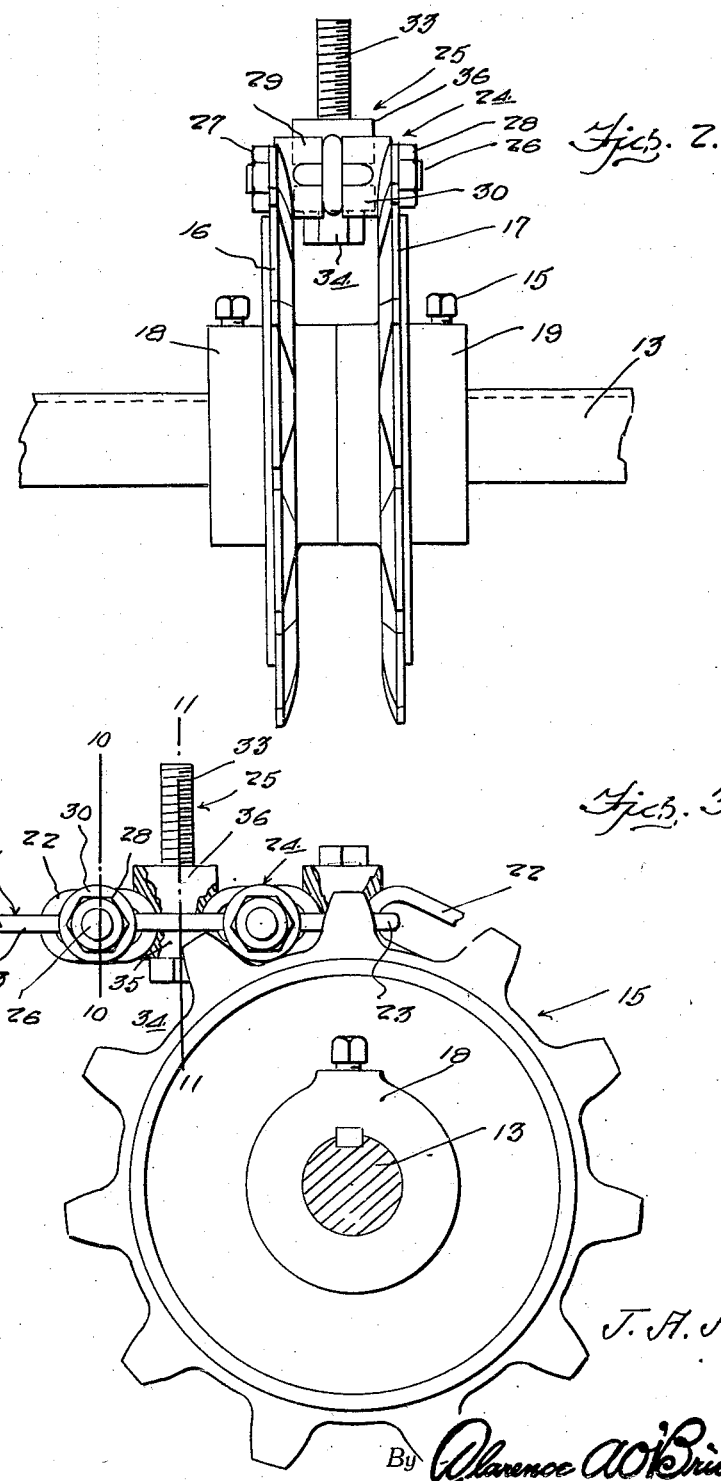
Inventor
J. A. Alger
By Clarence A. O'Brien
Attorney Jan. 27, 1931. J. A. ALGER 1,790,297
CHAIN AND SPROCKET CONSTRUCTION
Filed March 25, 1929 3 Sheets-Sheet 3
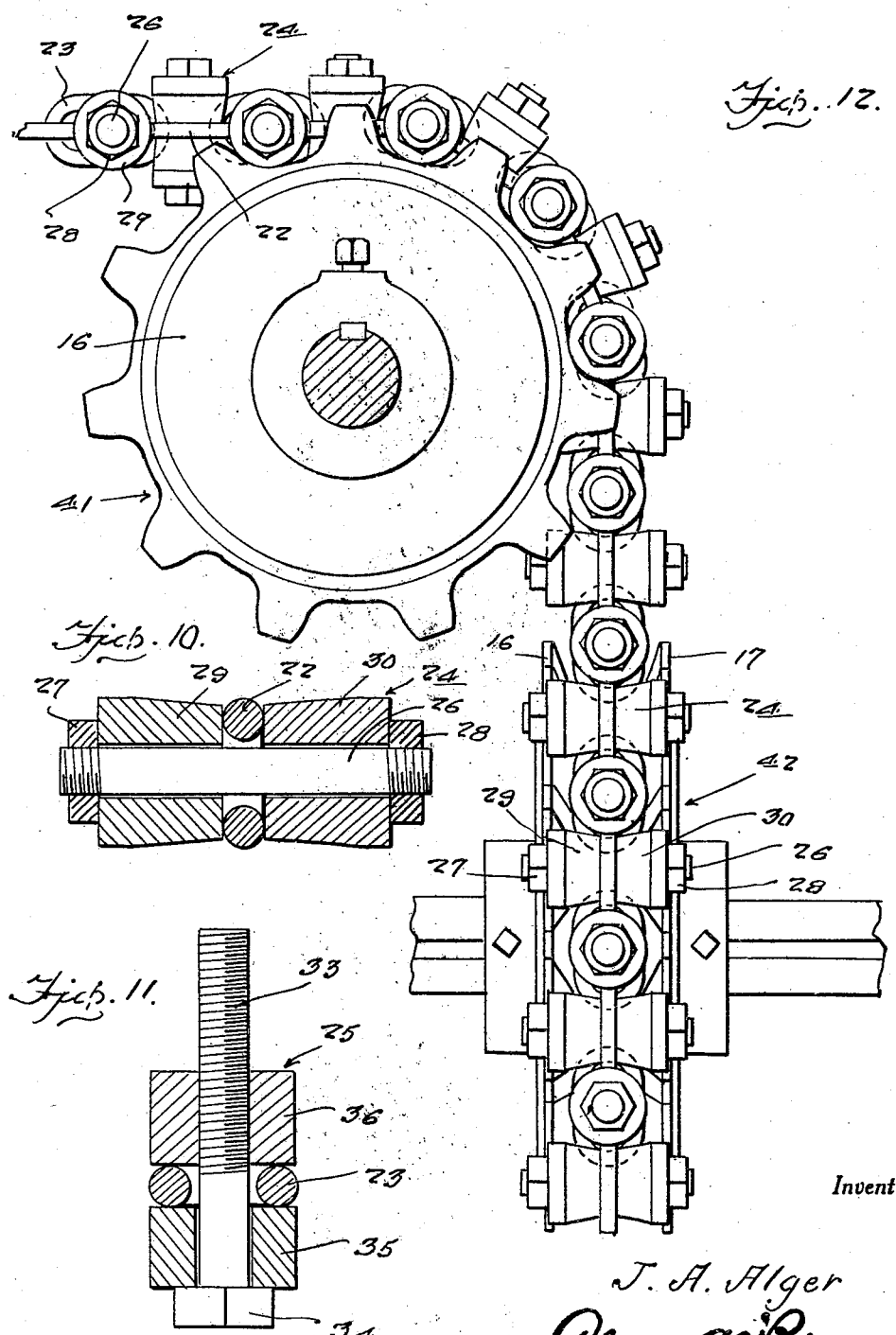
Inventor
J. A. Alger
By Clarence A. O'Brien
Attorney Patented Jan. 27, 1931

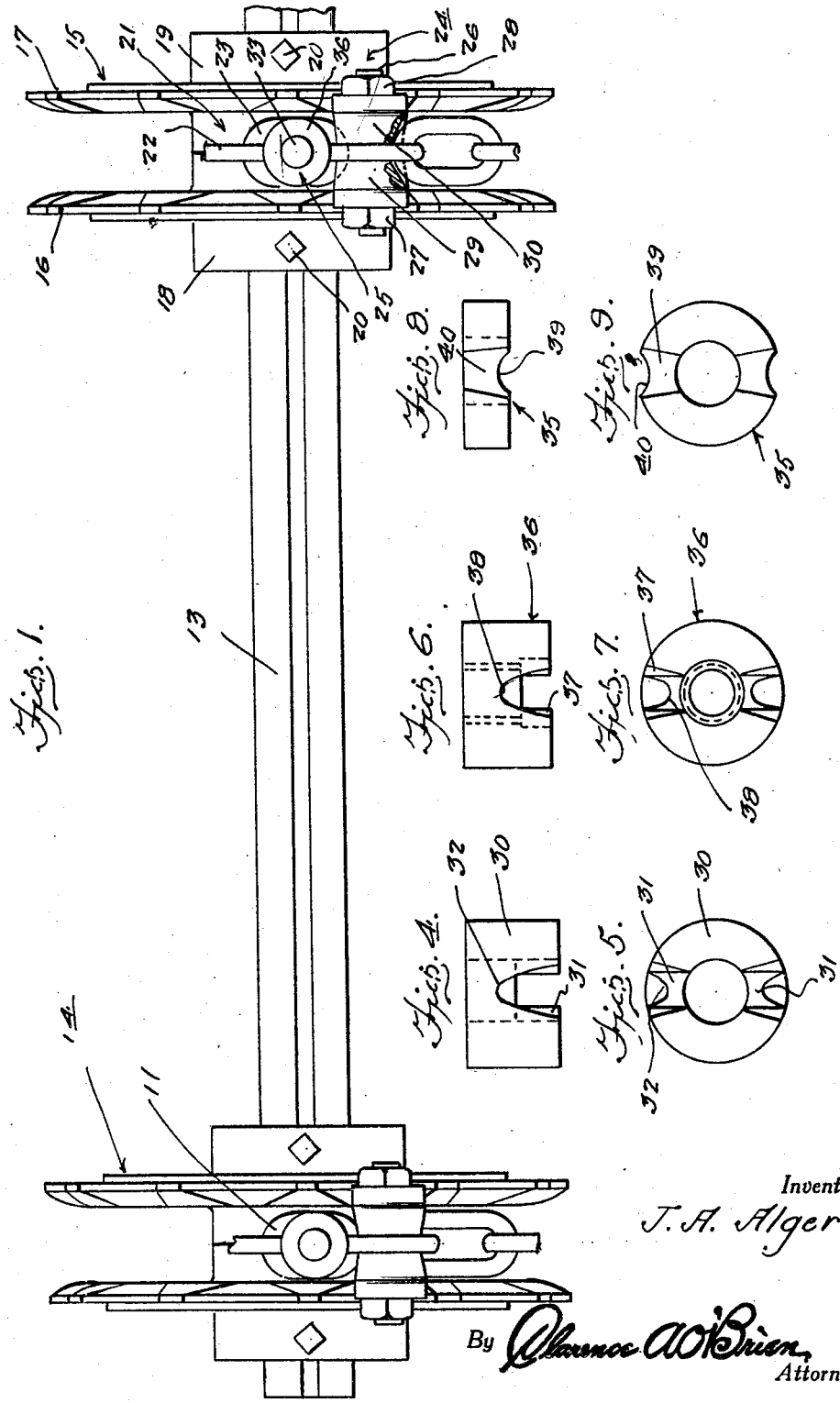

1,790,297

UNITED STATES PATENT OFFICE

JOHN ALBERT ALGER, OF MANTUA, OHIO

CHAIN AND SPROCKET CONSTRUCTION

Application filed March 25, 1929. Serial No. 349,734.

This invention relates to an improved chain and sprocket wheel structure susceptible of diversified usage in industrial and commercial work of all kinds, but especially adapted as a power transmission means capable of practical embodiment in excavating machines.

The invention is characterized in one respect by a distinctive type of sprocket wheel, generally referred to as a twin sprocket and embodying a pair of spaced toothed disks assembled in close spaced relation for producing a complete unit capable of efficient co-operation with the especially designed power transmission and tool carrier chain.

Likewise, the invention is further distinguishable in that it includes an especially designed chain, resembling what is sometimes referred to in the trade as an English log chain, and composed of interconnected ovate or elongated links and especially designed sprocket wheel lugs for clutches.

More specifically stated, I contemplate the provision of a chain of this general construction, wherein the lugs are alternately arranged at right angles to each other, whereby to permit the chain to be trained over power transmission sprocket wheels whose axes of rotation are at right angles to each other.

Other and more specific features and advantages of the invention will become more readily apparent from the following description and drawings.

In the drawings:

Figure 1 is an elevational view showing the shaft with a pair of twin sprockets mounted thereon, with fragmentary sections of the improved chain associated therewith.

Figure 2 is a similar elevational view, showing a pair of the chain lugs disposed at right angles with respect to each other.

Figure 3 is a side elevational view showing the sprocket wheel and a portion of the chain with portions broken away and shown in section to illustrate the relationship of elements in a more exacting manner.

Figures 4, 5, and 6, 7, 8, and 9 are detail views of parts employed in the construction of the distinct types of chain lugs.

Figure 10 is an enlarged fragmentary longitudinal sectional view through one of the multi-part chain lugs, showing the manner in which the lug is clamped upon the chain, the section being taken approximately upon the plane of the line 10—10 of Figure 3.

Figure 11 is a view similar to Figure 10 showing an excavating tool carrier lug, the section being taken on the line 11—11 of Figure 3.

Figure 12 is a view showing a greater portion of one of the power transmission chains and the manner in which it is associated with a pair of twin sprocket wheels whose shafts are arranged for rotation at right angles to each other and showing the manner in which the alternate arrangement of chain lugs comes into play.

In considering the invention it is to be borne in mind that the structure is principally developed for use in association with an excavating machine such as is used in digging ditches and the like.

As before intimated, I also have in mind the utilization of the same principle of construction for producing the novel power transmission means. Hence, I would state here that the power transmission means is detailed in Figure 12.

Figures 1 to 11 inclusive, however, are directed more particularly to the structure used upon excavating machines and the like. Hence attention is first invited to Figures 1 to 11 inclusive.

Confining attention at this time to Figure 1, it will be seen that the reference character 13 designates a shaft, on the opposite end portion of which I show a pair of twin sprocket wheels 14 and 15, respectively. I show a pair of wheels in order to illustrate the bodily adjustment of these wheels toward and from each other, to accommodate excavations of different widths.

However, the construction of each end is the same and the description of one will suffice for both. With this in mind, it will be seen that each sprocket wheel comprises a pair of duplicate discs 16, and 17, whose peripheral portions are formed with sprocket teeth and whose central portions are provided with hub portions 18 and 19, disposed in abutting relation and keyed on the shaft and held firmly in place by the retaining screws 20. The especially designed power transmission and tool carrying chain which is used in association with this sprocket wheel is generally designated by the reference character 21.

The chain proper is composed of a plurality of elongated or ovate links 22, and 23, respectively, arranged at right angles with respect to each other and interconnected with each other in the usual way. On each link is a sprocket wheel engaging lug or clutch device. These devices are arranged alternately with respect to each other, thereby assuming positions at right angles with respect to each other. There are two different species or types of lugs employed and the essential parts of each are the same, in that they comprise portions which are clamped against opposite faces of the complemental carrying links.

One type is generally designated by the reference character 24 (see Figure 10) and the other type by the reference character 25 (see Figure 11). The types 24 are arranged in close spaced relationship, whereas the types 25 are disposed in longitudinally spaced relationship, in order that they may serve as tool carriers for the excavating buckets (not shown).

The lug 24, in Figure 10, comprises a connecting bolt 26, whose opposite ends are screw threaded, to accommodate retaining nuts 27 and 28. This bolt extends through the complemental link and through a pair of bushing like collars or clamping elements 29 and 30, respectively. These are slightly inwardly tapered as shown and bound firmly against the opposite sides of the links for tightening the nuts 27 and 28, in an obvious manner. As seen in Figures 4 and 5, these clamping collars are identical in construction and they are provided with peripheral face grooves 31 disposed at diametrically opposite points, and complemental peripheral notches 32. These features 31 and 32 form pockets in which the opposite end portions of the adjacent links of the chain are loosely received. In other words, the links are pocketed to receive complemental recesses, as seen in Figure 3. This permits a relative flexible movement between the adjacent lugs of the complete chain. In fact, it provides an unusual flexibility in construction and virtually effects a universal joint connection between the respective links and lugs.

This may be better understood by assuming that each link is provided with a lug and each lug is disposed at right angles with respect to the next adjacent lug and the ends of the first named links are received in the recesses or pockets in the next adjacent links and allowed to move sidewise and vertically as is evident from Figure 3.

It is also to be noted that the lugs are of a length to bridge the space between the respective disks of the twin sprocket wheel and to engage on opposite sprocket teeth, whereby to effect a driving connection between the chain and the sprocket wheel.

Referring again to Figure 11, it will be seen that the tool carrier lug is slightly different in construction, in that it includes a bolt 33 having a head 34 at one end, a ring like washer or collar 35 surrounding the headed end of the bolt, and a nut 36 on the threaded portion. The nut is threaded down on the bolt to bind the link against the washer 35 and the washer against the head 34, thereby providing a tight assembled unit, for permitting the threaded ends of the bolt to protrude a sufficient distance to permit attachment of the coupling means of the excavating mechanism (not shown) thereto. These particular lugs 35 occur at predetermined longitudinally spaced distances on the chain. In other words, they occur wherever an excavating bucket is necessary.

Incidentally, in Figures 6 and 7 I show a detailed construction of one of the nuts 36. It is provided with complemental diametrically opposite peripheral notches 37 and 38 which register with the notches 39 and 40, of the washer 35, shown in Figures 8 and 9. When these features 37, 38, 39 and 40 come into registry with each other they form the same sort of pockets or recesses as already described to accommodate the end portions of the complemental links of the chain, thereby effecting the desired flexible joints or connection. Thus, in a generic sense it is obvious that the lugs 24 and 25 possess the same essential features which may be broadly referred to as a pair of clamping blocks on opposite sides of the complemental link of the chain, and means for clamping these against the chain to effect a complete and dependable unit.

So far as the structure seen in Figure 12 is concerned, the details are substantially the same as those already described. In fact, the same reference characters are employed to designate like parts in this view. It is to be noted that there are none of the carrier lugs 25 embodied in this particular form of chain. The point to be brought out in Figure 12 is that the right angular and alternate relationship of the lugs is such as to permit the chain to effectively drive a pair of sprocket wheels. For instance, the reference character 48 designates one sprocket wheel and 42 the complemental sprocket wheel, these being arranged at right angles to each other, or rather their shafts being arranged at right angles to each other. The vertical lugs passing between the discs of the wheel 41 are inactive, so far as the drive is concerned. These lugs, however, become active, as the chain passes over the sprocket wheel 42 at the bottom. This accounts for the novelty alleged and the alternate right angular relationship of the lug on the chain.

It is thought that by carefully analyzing the description in conjunction with the drawings, a clear understanding of the construction, features and advantages of the invention will be had. For this reason, a more lengthy description is regarded unnecessary.

Minor changes in shape, size, and rearrangement of details coming within the field of invention claimed may be resorted to, in actual practice, if desired.

I claim:—

1. In a structure of the class described, a chain embodying an elongated open link, bushing-like blocks disposed against opposite sides of said link, and means for clamping said blocks in position, the adjacent faces of said blocks being provided with complemental notches constituting clearance pockets for reception of the end portions of adjacent and complemental links of the chain, whereby to effect flexible joint connection between the respective links and lugs.

2. In a structure of the class described, an elongated chain link, a tool carrier lug comprising a headed bolt including a screw-threaded shank passing through said link, a collar surrounding said shank and interposed between the link and the head of the bolt, and a clamping nut carried by the screw-threaded portion of the shank and the bolt and engaging the opposite sides of said link, the extremity of the screw threaded portion of the bolt extending beyond the nut to accommodate an attaching device for an excavating element.

In testimony whereof I affix my signature.

JOHN ALBERT ALGER.